United States Patent Office 3,838,166
Patented Sept. 24, 1974

3,838,166
LOWER ALKYL(3-CYANO-PYRROL-2-YL) OXAMATES
Charles De Witt Blanton, Jr., 130 Broomsedge Trail, Athens, Ga. 30601, and Herbert G. Johnson, 3727 Middlebury Drive, Kalamazoo, Mich. 49007
No Drawing. Filed Sept. 27, 1972, Ser. No. 292,652
Int. Cl. C07d 27/22
U.S. Cl. 260—326.2                                       4 Claims

ABSTRACT OF THE DISCLOSURE

This invention relates to novel compounds of the formula

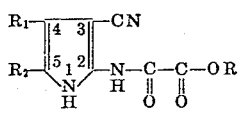

wherein R is lower alkyl of 1 through 6 carbon atoms, $R_1$ is selected from the group consisting of lower alkyl or 1 through 6 carbon atoms,

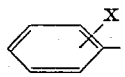

wherein X is selected from the group consisting of hydrogen, fluorine, chlorine, bromine, methoxy, and methyl, and $R_2$ is selected from the group consisting of hydrogen and lower alkyl of 1 through 6 carbon atoms. The new products of Formula I are useful as anti-allergenics.

---

The part of the invention described herein that was discovered by Dr. Blanton, namely, the synthesis of the compounds embraced by Formula I, above, was made in the course of his work under a grant or award from the U.S. Department of Health, Education, and Welfare.

CROSS REFERENCE TO RELATED APPLICATIONS

None.

BRIEF SUMMARY OF THE INVENTION

This invention relates to novel compounds of the formula

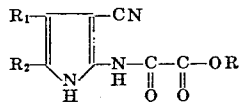

wherein R is lower alkyl of 1 through 6 carbon atoms, $R_1$ is selected from the group consisting of lower alkyl of 1 through 6 carbon atoms,

wherein X is selected from the group consisting of hydrogen, fluorine, chlorine, bromine, methoxy and methyl, and $R_2$ is selected from the group consisting of hydrogen and lower alkyl of 1 through 6 carbon atoms.

As employed in this application, the term "lower alkyl" includes methyl, ethyl, propyl, isopropyl, butyl, isobutyl, tert, butyl, pentyl, isopentyl, neopentyl, hexyl, isohexyl and 3,3-dimethylbutyl.

The novel compounds (I) of this invention and a process for their preparation are represented by the following sequence of formulae:

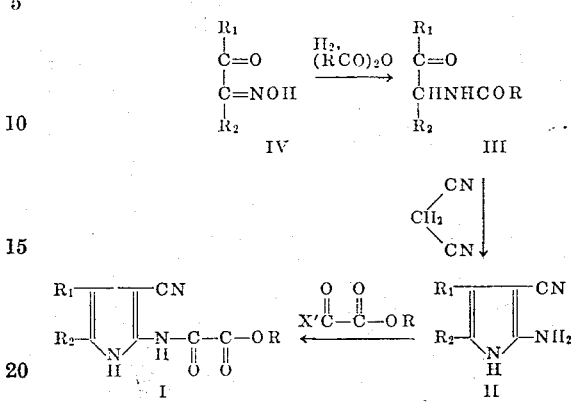

wherein R, $R_1$ and $R_2$ have the same meaning as above and X' is selected from the group consisting of fluorine, chlorine and bromine.

The novel compounds of Formula I are prepared by the acylation of the corresponding 2-amino compounds of Formula II. A number of compounds of Formula II are known in the art. e.g., those prepared in the manner described by Gewald in Z. Chem, 1, 349; numerous others (II) and can be prepared by the condensation of a corresponding N-acylated aminoketone of Formula III (many of which are known in the art) with malononitrile followed by $N^1$-deacylation. The compounds of Formula III are prepared by the concomitant reduction and acylation of a known 3-oxime of Formula IV.

The compounds embraced by Formula I of the flowsheet, above, when employing the compounds of Formula IV thereof as starting materials, are prepared by the procedures indicated therein, using the methods and reactions described below.

(1) The first step (IV→III) of the aforesaid flowsheet comprises the concomitant reduction and acylation of a 3-oxime (IV), e.g., by its reaction with hydrogen (in the presence of a catalyst such as palladium on charcoal) and an anhydride of a hydrocarbon carboxlic acid (such as acetic anhydride, propionic anhydride, butyric anhydride and the like) in an acid medium (e.g., acetic acid, propionic acid, butyric acid), to yield a corresponding N-acylated aminoketone (III), i.e., an N-(1-alkylacylonyl) acylamide (III).

(2) The next step (III→II) involves the condensation of an N-acylated aminoketone (III) produced in step (1) by its reaction with malononitrile followed by $N^1$-deacylation to give a corresponding 2-amino-3-cyano-4-substituted (or 4,5-disubstituted)pyrrole (II). The pyrrole (II) can be prepared, for example, by (a) refluxing approximately equimolar amounts of an N-acylated aminoketone (III) and malononitrile in ethanol or water with 1 equivalent of sodium hydroxide or triethylamine and the corresponding pyrrole (II) crystallized by the addition of water or extraction with ether; or (b) mixing approximately equimolar amounts of III and the nitrile in the cold and adding 50% aqueous potassium hydroxide solution until a pH of 12 to 13 is reached and a precipitate forms, which on warming dissolves and following cooling and dilution with ice water gives the corresponding pyrrole (II).

Alternately, compounds of Formula II can be prepared by treatment of aminoketones of the Formula V, prepared by reduction of compounds of Formula IV in the absence of acyl anhydrides, in the usual manner with malononitrile.

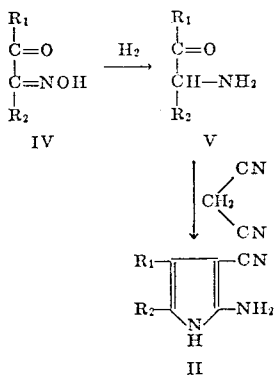

(3) The third step (II→I) of the process comprises the acylation of a 2-amino-3-cyano-4-substituted (or 4,5-disubstituted)pyrrole (II) obtained in step (2), e.g., by slowly adding to a cold (0° C.) solution of a pyrrole (II) in a solvent such as ethyl acetate along with a base such as triethylamine, an alkyl halide (e.g., methyl oxalyl chloride, ethyl oxalyl chloride, butyl oxalyl fluoride, pentyl oxalyl bromide, etc.) [employing approximately equimolar amounts of pyrrole (II) and alkyl oxalyl halide], to yield a corresponding alkyl [3-cyano-4-substitued (or 4,5-disubstituted)-2-pyrryl]oxamate (I).

All of the compounds included within Formula I, and the intermediates II, III and V therefor of the flow-sheets, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, ethyl acetate ether, methylene chloride and Skellysolve B (hexanes), mixtures and combinations of these solvents; also by gradient elution chromatography from an adsorbent column with a Skellysolve B, acetone-Skellysolve B, and the like.

The novel compounds (I) of this invention have antiallergenic (especially anti-asthmatic) activity, inhibiting a positive Passive Cutaneous Anaphylactic (PCA) test induced by the rat immunochemical counterpart of human IgE (reagin), considered indicative of allergic activity. This activity is apparent when these compounds are tested for their inhibition of the rat's PCA reaction. The PCA assay is described by I. Mota in Ann. N.Y. Acad. Sci., $103$, 264 (1963).

The compounds of Formula I of the invention can be prepared and administered to humans, mammals, birds and animals, in a wide variety of oral or parenteral dosage forms, singly or in admixture with other coacting compounds, in doses of from about 0.1 to about 100 mg./kg., depending on the severity of the condition being treated and the recipient's response to the medication. They can be administered with a pharmaceutical carrier which can be a solid material or a liquid in which the compound is dissolved, dispersed or suspended. The solid compositions can take the form of tablets, powders, capsules, pills, or sprays, preferably in unit dosage forms for simple administration or precise dosages. The liquid compositons, emulsions, suspensions, syrups or aerosols.

DETAILED DESCRIPTION

The following preparations and examples are illustrative of the manner of making and using the invention and set forth the best mode contemplated by the inventor of carrying out his invention, but are not to be construed as limiting the scope thereof.

Preparation 1.—2-amino-3-cyano-4,5-dimethylpyrrole (II)

In a 500 ml. pressure bottle there is placed 10.11 g. (0.1 mole) of 2,3-butanedione 3-monoxime (IV), prepared as in Org. Synthesis, Coll. Vol. II, 204 (1943), 1.5 g. of 5% palladium on carbon, 80 ml. of acetic acid and 20 ml. of acetic anhydride. The bottle is put on a shaker hydrogenating apparatus and hydrogen at 60 pounds per square inch admitted. After about 40 minutes, the reaction is complete and the catalyst is removed by filtration. Three such reductions are carried out and the filtrates combined and concentrated under vacuum. The thus produced residual oil, N-(1-methylacetonyl)acetamide (III), is washed into a flask with about 100 ml. of methanol and the flask placed in an ice-bath. To the chilled mixture 26.4 g. (0.4 mole) of malononitrile (or dicyanomethane) is added with stirring. To the stirring mixture, 50% aqueous potassium hydroxide solution is added dropwise until a pH of 12 to 13 is reached. Shortly after this pH is obtained, a precipitate appears. The mixture containing the precipitate is stirred for about 15 minutes more at the cold temperature, and then placed in a water bath at about 45 to 50° C. for about 45 minutes. The precipitate dissolves to yield a red solution. This solution is cooled and diluted with about 400 to 500 ml. of ice water to give a precipitate which is collected and washed with cold water until the filtrate is free of color. The precipitated crude pyrrole (II) amounting to about 20 g. (about 50% of the theoretical yield) is recrystalized from aqueous methanol to yield 2-amino-3-cyano-4,5-dimethylpyrrole (II) melting at 165 to 168° C.

Preparation 2.—2-amino-3-cyano-4,5-diethylpyrrole (II)

Following the procedure of Preparation 1 but substituting 3,4-hexanedione 4-oxime (IV) (prepared as in U.S. Pat. 2,393,532) as starting material, yields 2-amino-3-cyano-4,5-diethylpyrrole (II).

Preparation 3.—2-amino-3-cyano-4,5-dipropylpyrrole (II)

Following the procedure of Preparation 1 but substituting 4,5-octanedione 5-oxime (IV) (prepared as in Bull. Soc. Chim., $41$, 1370) as starting material, yields 2-amino-3-cyano-4,5-dipropylpyrrole (II).

Preparation 4.—2-amino-3-cyano-4,5-diisopropylpyrrole (II)

Following the procedure of Preparation 1 but substituting 2,5-dimethyl-3,4-hexanedione 4-oxime (IV) (prepared as in Ber. $16$, 2991) as starting material, yields 2-amino-3-cyano-4,5-diisopropylpyrrole (II).

Preparation 5.—2-amino-3-cyano-4,5-dibutypyrrole (II)

Following the procedure of Preparation 1 but substituting 5,6-decanedione 6-oxime (IV) (prepared as in J. Org. Chem., $24$, 1726) as starting material, yields 2-amino-3-cyano-4,5-dibutylpyrrole (II).

Preparation 6.—2-amino-3-cyano-4,5-dipentylpyrrole (II)

Following the procedure of Preparation 1 but substituting 6,7-dodecanedione 7-oxime (IV) (prepared as in Gazz. Chim. Ital., $31$, i, 406) as starting material, yields 2-amino-3-cyano-4,5-dipentylpyrrole (II).

Prepartion 7.—2-amino-3-cyano-4,5-dihexylpyrrole (II)

Following the procedure of Preparation 1 but substituting 7,8-tetradecanedione 8-oxime as starting material, yields 2-amino-3-cyano-4,5-hexylpyrrole (II).

Preparation 8.—2-amino-3-cyano-4-phenylpyrrole (II)

To a solution of 16.6 g. (0.097 mole) of 2-aminoacetophenone hydrochloride (V) (prepared as in J. Amer. Chem. Soc., $82$, 459) in 50 ml. of absolute ethanol, 7.65 g. (0.116 mole) of malononitrile and 9.85 g. (0.097 mole) of triethylamine is added. The mixture is stirred for about 1 hour at room temperature and then poured into about 1 l. of water. The resulting precipitate is removed by filtration, recrystallized from aqueous ethanol and the solid that forms triturated with benzene to give 7.4 g. of 2-amino-3-cyano-4-phenylpyrrole (II) melting at 170 to 172° C. An additional 2.6 g. of product (II) melting at 172 to 174° C. is obtained from the mother liquors.

Preparation 9.—2-amino-3-cyano-4-(p-bromo) phenylpyrrole (II)

Following the procedure of Preparation 8 but substituting 2 - amino-4'-bromoacetophenone hydrochloride (V) (prepared as in Compt. rend., 230, 662) as starting material, yields 2-amino - 3 - cyano-(p-chloro)phenylpyrrole (II).

Preparation 10.—2-amino-3-cyano-4-(p-chloro) phenylpyrrole (II)

Following the procedure of Preparation 8 but substituting 2 - amino-4'-chloroacetophenone hydrochloride (V) (prepared as in Compt. rend., 230, 662) as starting material, yields 2-amino-3-cyano-(p-chloro)phenylpyrrole (II).

Preparation 11.—2-amino-3-cyano-4-(p-fluoro) phenylpyrrole (II)

Following the procedure of Preparation 8 but substituting 2 - amino-4'-fluoroacetophenone hydrochloride (V) (prepared as in J. Chem. Soc., 1950, 2766) as starting material, yields 2-amino-3-cyano-4-(p-fluoro)phenylpyrrole (II).

Preparation 12.—2-amino-3-cyano-4-(m-bromo) phenylpyrrole (II)

Following the procedure of Preparation 8 but substituting 2 - amino-3'-bromoacetophenone hydrochloride (V) (prepared as in Compt. rend., 230, 662) as starting material, yields 2 - amino-3-cyano-4-(m-bromo)phenylpyrrole (II).

Preparation 13.—2-amino-3-cyano-4-(m-chloro) phenylpyrrole (II)

Following the procedure of Preparation 8 but substituting 2 - amino-3'-chloroacetophenone hydrochloride (V) (prepared as in Compt. rend., 230, 662) as starting material, yields 2 - amino-3-cyano-4-(m-chloro)phenylpyrrole (II).

Preparation 14.—2-amino-3-cyano-4-(m-fluoro) phenylpyrrole (II)

Following the procedure of Preparation 8 but substituting 2 - amino-3'-fluoroacetophenone hydrochloride (V) (prepared as in J. Chem. Soc., 1950, 2766) as starting material, yields 2-amino-3-cyano-4-(m-fluoro)phenylpyrrole (II).

Preparation 15.—2-amino-3-cyano-4-(o-bromo) phenylpyrrole (II)

Following the procedure of Preparation 8 but substituting 2 - amino-2'-bromoacetophenone hydrochloride (V) (prepared as in Compt. rend., 230, 662) as starting material, yields 2-amino-3-cyano-4-(o-bromo)phenylpyrrole (II).

Preparation 16.—2-amino-3-cyano-4-(o-chloro) phenylpyrrole (II)

Following the procedure of Preparation 8 but substituting 2 - amino-2'-chloroacetophenone hydrochloride (V) (prepared as in Compt. rend., 230, 662) as starting material, yields 2-amino-3-cyano-4-(o-chloro)phenylpyrrole (II).

Preparation 17.—2-amino-3-cyano-4-(o-fluoro) phenylpyrrole (II)

Following the procedure of Preparation 8 but substituting 2 - amino-2'-fluoroacetophenone hydrochloride (V) (prepared as in J. Chem. Soc., 1950, 2766) as starting material, yields 2 - amino-3-cyano-4-(o-fluoro)phenylpyrrole (II).

Preparation 18.—2-amino-3-cyano-4-(o-methoxy) phenylpyrrole (II)

Following the procedure of Preparation 8 but substituting 2 - amino-2'-methoxyacetophenone hydrochloride (V) (prepared as in Ber., 44, 1452) as starting material, yields 2-amino-3-cyano-4-(o-methoxy)phenylpyrrole (II).

Preparation 19.—2-amino-3-cyano-4-(m-methoxy) phenylpyrrole (II)

Following the procedure of Preparation 8 but substituting 2-amino-3'-methoxyacetophenone hydrochloride (V) (prepared as in Ber., 44, 1452) as starting material, yields 2-amino-3-cyano-4-(m-methoxy)phenylpyrrole (II).

Preparation 20.—2-amino-3-cyano-4-(p-methoxy) phenylpyrrole (II)

Following the procedure of Preparation 8 but substituting 2-amino-4'-methoxyacetophenone hydrochloride (V) (prepared as in Ber., 44, 1452) as starting material yields 2-amino-3-cyano-4-(p-methoxy)phenylpyrrole (II).

Preparation 21.—2-amino-3-cyano-4-(o-methyl) phenylpyrrole (II)

Following the procedure of Preparation 8 but substituting 2 - amino-2'-methylacetophenone hydrochloride (V) (prepared as in J. Chem. Soc., 1951, 255) as starting material, yields 2-amino-3-cyano-4-(o-methyl)phenylpyrrole (II).

Preparation 22.—2-amino-3-cyano-4-(m-methyl) phenylpyrrole (II)

Following the procedure of Preparation 8 but substituting 2 - amino-3'-methylacetophenone hydrochloride (V) (prepared as in J. Chem. Soc., 1951, 255) as starting material, yields 2-amino-3-cyano-4-(m-methyl)phenylpyrrole (II).

Preparation 23.—2-amino-3-cyano-4-(p-methyl) phenylpyrrole (II)

Following the procedure of Preparation 8 but substituting 2-amino - 4' - methylacetophenone hydrochloride (V) (prepared as in J. Chem. Soc., 1951, 255) as starting material, yields 2-amino-3-cyano-4-(p-methyl)phenylpyrrole (II).

Preparation 24.—2-amino-3-cyano-5-methyl-4-phenylpyrrole (II)

(a) To a solution of 13.05 g. (0.08 mole) of 1-phenyl-1,2-propanedione 2-oxime (IV) (prepared as in Atti. reale ist veneto sci, 10, part 2, 261) in 100 ml. of methanol and 7.78 ml. of concentrated hydrochloric acid, 200 mg. of platinum oxide catalyst is added. The resulting mixture is hydrogenated at an initial pressure of 3 atmospheres. When the uptake of hydrogen is complete, the catalyst is removed by filtration and the filtrate evaporated to dryness. The residue is first triturated with ether, then acetone, and recrystallized from ethanol-ether to give 2-aminopropiophenone hydrochloride (V).

(b) To a solution of 6.1 g. (0.033 mole) of 2-aminopropiophenone hydrochloride (V) [prepared as in (a), above] in 60 ml. of ethanol, 2 g. 0.0396 mole) of malononitrile is added. To the resulting solution, 3.35 g. (0.033 mole) of triethylamine is added with stirring at room temperature, which is continued for about 1 hour. This mixture is poured into 350 ml. of water to give a yellow precipitate that is removed by filtration and washed with water to yield 4.32 g. (66% yield) of 2-amino-3-cyano-5-methyl-4-phenylpyrrole (II), melting at 184 to 186° C.

Preparation 25.—2-amino-3-cyano-5-methyl-4-(p-chloro) phenylpyrrole (II)

Following the procedure of Preparation 24(b) but substituting 2 - amino-4'-chloropropiophenone hydrochloride (V) (prepared as in Ann., *599*, 61) as starting material, yields 2 - amino - 3-cyano-5-methyl-4-(p-chloro)phenylpyrrole (II).

Preparation 26.—2-amino-3-cyano-5-methyl-4-(p-fluoro) phenylpyrrole (II)

Following the procedure of Preparation 24(b) but substituting 2 - amino-4'-fluoropropiophenone hydrochloride (V) (prepared as in Ann., *599*, 61) as starting material, yields 2 - amino-3-cyano-5-methyl-4-(p-fluoro)phenylpyrrole (II).

Preparation 27.—2-amino-3-cyano-5-methyl-4-(p-bromo) phenylpyrrole (II)

Following the procedure of Preparation 24(b) but substituting 2 - amino-4'-bromopropiophenone hydrochloride (V) (prepared as in Ann., *599*, 61) as starting material, yields 2 - amino-3-cyano-5-methyl-4-(p-bromo)phenylpyrrole (II).

Preparation 28.—2-amino-3-cyano-5-methyl-4-(m-chloro) phenylpyrrole (II)

Following the procedure of Preparation 24(b) but substituting 2 - amino-3'-chloropropiophenone hydrochloride (V) (prepared as in Ann., *599*, 61) as starting material, yields 2-amino-3-cyano-5-methyl-4-(m-chloro)phenylpyrrole (II).

Preparation 29.—2-amino-3-cyano-5-methyl-4-(o-fluoro) phenylpyrrole (II)

Following the procedure of Preparation 24(b) but substituting 2 - amino-2'-fluoropropiophenone hydrochloride (V) (prepared as in Ann., *599*, 61) as starting material, yields 2 - amino-3-cyano-5-methyl-4-(o-fluoro)phenylpyrrole (II).

Preparation 30.—2-amino-3-cyano-5-methyl-4-(m-methoxy)phenylpyrrole (II)

Following the procedure of Preparation 24(b) but substituting 2-amino-3'-methoxypropiophenone hydrochloride (V) (prepared as in South African Pat. 67/7,302) as starting material, yields 2-amino-3-cyano-5-methyl-4-(m-methoxy)phenylpyrrole (II).

Preparation 31.—2-amino-3-cyano-5-methyl-4-(p-methoxy)phenylpyrrole (II)

Following the procedure of Preparation 24(b) but substituting 2-amino-4'-methoxypropiophenone hydrochloride (V) (prepared as in South African Pat. 67/7,302) as starting material, yields 2 - amino - 3 - cyano - 4-(p-methoxy) phenylpyrrole (II).

Preparation 32.—2-amino-3-cyano-5-methyl-4-(p-methyl) phenylpyrrole (II)

Following the procedure of Preparation 24(b) but substituting 2 - amino-4'-methylpropiophenone hydrochloride (V) [prepared as in Pharm. Bull. (Japan), *4*, 182] as starting material, yields 2-amino-3-cyano-5-methyl-4-(p-methyl)-phenylpyrrole (II).

Preparation 33.—2-amino-3-cyano-5-methyl-4-(p-ethyl) phenylpyrrole (II)

Following the procedure of Preparation 24(b) but substituting 2 - amino - 4'-ethylpropiophenone hydrochloride (V) [prepared as in Pharm. Bull. (Japan), *4*, 182] as starting material, yields 2 - amino-3-cyano-5-methyl-4-(p-ethyl)phenylpyrrole (II).

Preparation 34.—2-amino-3-cyano-5-methyl-4-(m-methyl) phenylpyrrole (II)

Following the procedure of Preparation 24(b) but substituting 2 - amino-3'-methylpropiophenone hydrochloride (V) [prepared as in Bull. Pharm. (Japan), *4*, 182] as starting material, yields 2 - amino-3-cyano-5-methyl-4-(m-methyl)phenylpyrrole (II).

Preparation 35.—2-amino-3-cyano-5-methyl-4-(o-methyl) phenylpyrrole (II)

Following the procedure of Preparation 24(b) but substituting 2 - amino-2'-methylpropiophenone hydrochloride (V) [prepared as in Bull. Pharm. (Japan), *4*, 182 as starting material, yields 2 - amino - 3 - cyano-5-methyl-4-(o-methyl)phenylpyrrole (II).

Preparation 36.—2-amino-3-cyano-4-methylpyrrole (II)

Following the procedure of Preparation 1 but substituting 1,2-propanedione 1-oxime (also named isonitroso-acetone or pyruvaldoxime, and prepared as in J. Chem. Soc., *117*, 589) as starting material, yields 2-amino-3-cyano-4-methylpyrrole (II).

Example 1.—Ethyl (3 - cyano-4,5-dimethyl-2-pyrryl)oxamate [also named ethyl(3-cyano-4,5-dimethylpyrrol-2-yl)oxamate] (I)

To 10 g. (0.074 mole) of 2-amino-3-cyano-4,5-dimethylpyrrole (II) (obtained as in Preparation 1) dissolved in 300 ml. of ethyl acetate, 7.59 g. of triethylamine is added. To this solution at about 0° C., 10.24 g. of ethyl oxalyl chloride in 25 ml. of ethyl acetate is added slowly with stirring. A yellow precipitate forms immediately, and the reaction mixture is stirred for about 2 hours in an ice-bath and for about 1 hour at room temperature. The triethylamine hydrochloride is removed by filtration and the filtrate stored for about 16 hours. Evaporation of the solvent under vacuum gives a reddish solid having a melting point of 100 to 120° C. Recrystallization from 95% ethanol yields 11.5 g. of bright yellow ethyl (3-cyano-4,5-dimethyl-2-pyrryl)oxamate (I), having a melting point of 132 to 133° C.

Following the procedure of Example 1 but substituting another alkyl oxalyl halide for ethyl oxalyl chloride, such as (1) methyl oxalyl chloride
(2) propyl oxalyl fluoride
(3) isopropyl oxalyl chloride
(4) butyl oxalyl chloride
(5) isobutyl oxalyl fluoride
(6) pentyl oxalyl chloride
(7) hexyl oxalyl fluoride, etc., yields, respectively, (1) methyl (3-cyano-4,5-dimethyl-2-pyrryl)oxamate (I),
(2) propyl (3-cyano-4,5-dimethyl-2-pyrryl)oxamate (I),
(3) isopropyl (3-cyano-4,5-dimethyl-2-pyrryl) oxamate (I),
(4) butyl (3-cyano-4,5-dimethyl-2-pyrryl)oxamate (I),
(5) isobutyl (3-cyano-4,5-dimethyl-2-pyrryl)oxamate (I),
(6) pentyl (3-cyano-4,5-dimethyl-2-pyrryl)oxamate (I),
(7) hexyl (3-cyano-4,5-dimethyl-2-pyrryl)oxamate (I), etc.

Following the procedure of Example 1 and the paragraph thereafter but employing another pyrrole (II) as starting material and reacting it with the same or another alkyl oxalyl halide, such as (1) 2 - amino-3-cyano-4,5-diethylpyrrole (II) (obtained as in Preparation 2) and methyl oxalyl chloride,
(2) 2 - amino-3-cyano-4,5-dipropylpyrrole (II) obtained as in Preparation 3) and propyl oxalyl fluoride,
(3) 2-amino-3-cyano - 4,5 - diisopropylpyrrole (II) (obtained as in Preparation 4) and ethyl oxalyl chloride,
(4) 2 - amino-3-cyano-4,5-dibutylpyrrole (II) (obtained as in Preparation 5) and isopropyl oxalyl chloride,
(5) 2-amino-3-cyano-4,5-dipentylpyrrole (II) (obtained as in Preparation 6) and butyl oxalyl fluoride,
(6) 2 - amino-3-cyano-4,5-dihexylpyrrole (II) (obtained as in Preparation 7) and hexyl oxalyl chloride,
(7) 2-amino-3-cyano-4-phenylpyrrole (II) (obtained as in Preparation 8) and ethyl oxalyl chloride, (8) 2-amino-3-cyano - 4 - (p-bromo)phenylpyrrole (II) (obtained as in Preparation 9) and isobutyl oxalyl fluoride,
(9) 2-amino-3-cyano - 4 - (p-chloro)phenylpyrrole (II) (obtained as in Preparation 10) and methyl oxalyl chloride,
(10) 2-amino-3-cyano - 4 - (p-fluoro)phenylpyrrole (II) (obtained as in Preparation 11) and ethyl oxalyl chloride,
(11) 2 - amino-3-cyano-4-(m-bromo)phenylpyrrole (II) (obtained as in Preparation 12) and propyl oxalyl chloride,
(12) 2 - amino-3-cyano-4-(m-chloro)phenylpyrrole (II) (obtained as in Preparation 13) and hexyl oxalyl chloride,
(13') 2-amino-3-cyano - 4 - (m-fluoro)phenylpyrrole (II) (obtained as in Preparation 13) and hexyl oxalyl chloride,
(13) 2-amino-3-cyano - 4 - (m-fluoro)phenylpyrrole (II) (obtained as in Preparation 14) and butyl oxalyl chloride,
(14) 2-amino-3-cyano - 4 - (o-bromo)phenylpyrrole (II) (obtained as in Preparation 15) and ethyl oxalyl chloride,
(15) 2-amino-3-cyano - 4 - (o-chloro)phenylpyrrole (II) (obtained as in Preparation 16) and methyl oxalyl chloride,
(16) 2-amino-3-cyano - 4 - (o-fluoro)phenylpyrrole (II) (obtained as in Preparation 17) and ethyl oxalyl fluoride,
(17) 2-amino-3-cyano-4-(o-methoxy)phenylpyrrole (II) (obtained as in Preparation 18) and propyl oxalyl chloride,
(18) 2-amino-3-cyano-4-(m-methoxy)phenylpyrrole (II) (obtained as in Preparation 19) and pentyl oxalyl fluoride,
(19) 2-amino-3-cyano-4-(p-methoxy)phenylpyrrole (II) (obtained as in Preparation 20) and hexyl oxalyl chloride,
(20) 2 - amino-3-cyano-4-(o-methyl)phenylpyrrole (II) (obtained as in Preparation 21) and butyl oxalyl fluoride,
(21) 2 - amino-3-cyano-4-(m-methyl)phenylpyrrole (II) (obtained as in Preparation 22) and methyl oxalyl fluoride,
(22) 2-amino-3-cyano-4-(p - methyl)phenylpyrrole (II) (obtained as in Preparation 23) and ethyl oxalyl chloride,
(23) 2-amino-3-cyano-5-methyl - 4 - phenylpyrrole (II) (obtained as in Preparation 24) and ethyl oxalyl chloride,
(24) 2-amino-3-cyano-5-methyl - 4 - (p-chloro)phenylpyrrole (II) (obtained as in Preparation 25) and methyl oxalyl chloride,
(25) 2-amino-3-cyano-5-methyl-4-(p - fluoro)phenylpyrrole (II) (obtained as in Preparation 26) and ethyl oxalyl chloride,
(26) 2-amino-3-cyano-5-methyl - 4 - (p-bromo)phenylpyrrole (II) (obtained as in Preparation 27) and methyl oxalyl chloride,
(27) 2-amino-3-cyano-5-methyl - 4 - (m-chloro)phenylpyrrole (II) (obtained as in Preparation 28) and methyl oxalyl fluoride,
(28) 2-amino-3-cyano-5-methyl - 4 - (o - fluoro)phenylpyrrole (II) (obtained as in Preparation 29) and ethyl oxalyl chloride,
(29) 2-amino-3-cyano-5-methyl-4-(m - methoxy)phenylpyrrole (II) (obtained as in Preparation 30) and ethyl oxalyl chloride,
(30) 2-amino-3-cyano-5-methyl-4-(p - methoxy)phenylpyrrole (II) (obtained as in Preparation 31) and butyl oxalyl chloride,
(31) 2-amino-3-cyano-5-methyl - 4 - (p-methyl)phenylpyrrole (II) (obtained as in Preparation 32) and ethyl oxalyl chloride,
(32) 2-amino-3-cyano-5-methyl - 4 - (p-ethyl)phenylpyrrole (II) (obtained as in Preparation 33) and methyl oxalyl chloride,
(33) 2-amino-3-cyano-5-methyl - 4 - (m-methyl)phenylpyrrole (II) (obtained as in Preparation 34) and ethyl oxalyl chloride,
(34) 2-amino-3-cyano-5-methyl - 4 - (o - methyl)phenylpyrrole (II) (obtained as in Preparation 35) and ethyl oxalyl chloride,
(35) 2-amino-3-cyano-4-methylpyrrole (II) (obtained as in Preparation 36) and ethyl oxalyl chloride, etc., yields, respectively, (1) methyl (3-cyano-4,5-diethyl-2-pyrryl)oxamate (I),
(2) propyl (3-cyano-4,5-dipropyl-2-pyrryl)oxamate (I),
(3) ethyl (3-cyano-4,5-diisopropyl-2-pyrryl)oxamate (I),
(4) isopropyl (3-cyano-4,5-dibutyl-2-pyrryl)oxamate (I),
(5) butyl (3-cyano-4,5-dipentyl-2-pyrryl)oxamate (I),
(6) hexyl (3-cyano-4,5-dihexyl-2-pyrryl)oxamate (I),
(7) ethyl (3-cyano-4-phenylpyrrol-2-yl)oxamate (I),
(8) isobutyl [3-cyano - 4 - (p-bromo)phenylpyrrol-2-yl]oxamate (I),
(9) methyl [3-cyano-4-(p-chloro)phenylpyrrol-2-yl]oxamate (1),
(10) ethyl [3-cyano-4-(p-fluoro)phenylpyrrol-2-yl]oxamate (1),
(11) propyl [3-cyano-4-(m-bromo)phenylpyrrol-2-yl]oxamate (1),
(12) hexyl [3-cyano-4-(m-chloro)phenylpyrrol-2-yl]oxamate (1),
(13) butyl [3-cyano-4-(m-fluoro)phenylpyrrol-2-yl]oxamate (1),
(14) ethyl [3-cyano-4-(o-bromo)phenylpyrrol-2-yl]oxamate (1),
(15) methyl [3-cyano-4-(o-chloro)phenylpyrrol-2-yl]oxamate (1),
(16) ethyl [3-cyano-4-(o-fluoro)phenylpyrrol-2-yl]oxamate (1),
(17) propyl [3-cyano-4-(o-methoxy)phenylpyrrol-2-yl]oxamate (1),
(18) pentyl [3-cyano-4-(m-methoxy)phenylpyrrol-2-yl]oxamate (1),
(19) hexyl [3-cyano-4-(p-methoxy)phenylpyrrol-2-yl]oxamate (1),
(20) butyl [3-cyano-4-(o-methyl)phenylpyrrol-2-yl]oxamate (1),
(21) methyl [3-cyano-4-(m-methyl)phenylpyrrol-2-yl]oxamate (1),
(22) ethyl [3-cyano-4-(p-methyl)phenylpyrrol-2-yl]oxamate (1),
(23) ethyl [3-cyano-4-methyl-4-phenylpyrrol-2-yl]oxamate (1),
(24) methyl [3-cyano-5-methyl-4-(p-chloro)phenylpyrrol-2-yl]oxamate (1),
(25) ethyl [3-cyano-5-methyl-4-(p-fluoro)phenylpyrrol-2-yl]oxamate (1),
(26) methyl [3-cyano-5-methyl-4-(p-bromo)phenylpyrrol-2-yl]oxamate (1),
(27) methyl [3-cyano-5-methyl-4-(m-chloro)phenylpyrrol-2-yl)oxamate (1),
(28) ethyl [3-cyano-5-methyl-4-(o-fluoro)phenylpyrrol-2-yl]oxamate (1),
(29) ethyl [3-cyano-5-methyl-4-(m-methoxy)phenylpyrrol-2-yl]oxamate (1),
(30) butyl [3-cyano-5-methyl-4-(p-methyl)phenylpyrrol-2-yl]oxamate (1),
(31) ethyl [3-cyano-5-methyl-4-(p-methyl)phenylpyrrol-2-yl]oxamate (1),
(32) methyl [3-cyano-5-methyl-4-(p-ethyl)phenylpyrrol-2-yl]oxamate (1),
(33) ethyl [3-cyano-5-methyl-4-(m-methyl)phenylpyrrol-2-yl]oxamate (1),
(34) ethyl [3-cyano-5-methyl-4-(o-methyl)phenylpyrrol-2-yl]oxamate (1),
(35) ethyl (3-cyano-4-methyl-2-pyrryl)oxamate (1), etc.

What is claimed is:

1. A compound of the formula

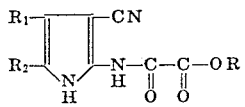

wherein R is lower alkyl of 1 through 6 carbon atoms, $R_1$ is selected from the group consisting of lower alkyl of 1 through 6 carbon atoms,

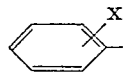

wherein X is selected from the group consisting of hydrogen, fluorine, chlorine, bromine, methoxy, and methyl, and $R_2$ is selected from the group consisting of hydrogen and lower alkyl of 1 through 6 carbon atoms.

2. A compound of claim 1 wherein R is ethyl and $R_1$ and $R_2$ are methyl, namely, ethyl (3-cyano-4,5-dimethyl-2-pyrryl)oxamate.

3. A compound of claim 1 wherein R is ethyl, $R_1$ is

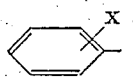

wherein X is hydrogen and $R_2$ is hydrogen, namely, ethyl (3-cyano-4-phenylpyrrol-2-yl)oxamate.

4. A compound of claim 1 wherein R is ethyl, $R_1$ is

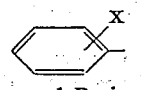

wherein X is hydrogen and $R_2$ is methyl, namely, ethyl (3-cyano-5-methyl-4-phenylpyrrol-2-yl)oxamate.

References Cited

Theilheimer: Synthetic Methods of Organic Chemistry, vol. 16 (1962), p. 235, No. 502.

JOSEPH A. NARCAVAGE, Primary Examiner

U.S. Cl. X.R.

260—326.62; 424—274

UNITED STATES PATENT OFFICE
CERTIFICATE OF CORRECTION

Patent No. 3,838,166    Dated September 24, 1974

Inventor(s) Charles DeWitt Blanton, Jr. and Herbert G. Johnson

It is certified that error appears in the above-identified patent and that said Letters Patent are hereby corrected as shown below:

Column 3, line 25, "alkyl halide" should read -- alkyl oxalyl halide --; lines 44-45, "with a Skellysolve B," should read -- with a suitable mixture of solvents, such as, methylene chloride-Skellysolve B, --. Column 5, line 13, "-3-cyano-(p-chloro)phenylpyrrole" should read -- -3-cyano-4-(p-bromo)phenylpyrrole --. Column 10, line 65, "-4-(p-methyl)phenylpyrrol-" should read -- -4-(p-methoxy)phenylpyrrol- --.

Signed and Sealed this second Day of August 1977

[SEAL]

Attest:

RUTH C. MASON  
*Attesting Officer*

C. MARSHALL DANN  
*Commissioner of Patents and Trademarks*